(12) United States Patent
Nonaka et al.

(10) Patent No.: US 9,580,060 B2
(45) Date of Patent: Feb. 28, 2017

(54) POWER TRANSMITTING APPARATUS

(71) Applicant: Kabushiki Kaisha F.C.C., Hamamatsu-shi (JP)

(72) Inventors: Masayuki Nonaka, Hamamtsu (JP); Go Ando, Hamamatsu (JP); Hideki Nagasaka, Hamamatsu (JP); Hideyuki Oishi, Hamamatsu (JP)

(73) Assignee: Kabushiki Kaisha F.C.C., Shizuoka (JP)

( * ) Notice: Subject to any disclaimer, the term of this patent is extended or adjusted under 35 U.S.C. 154(b) by 229 days.

(21) Appl. No.: 14/262,607

(22) Filed: Apr. 25, 2014

(65) Prior Publication Data

US 2014/0235407 A1 Aug. 21, 2014

Related U.S. Application Data

(63) Continuation of application No. PCT/JP2012/077652, filed on Oct. 25, 2012.

(30) Foreign Application Priority Data

Oct. 27, 2011 (JP) ................. 2011-236447

(51) Int. Cl.
*B60W 10/02* (2006.01)
*F16D 13/54* (2006.01)
(Continued)

(52) U.S. Cl.
CPC ............ *B60W 10/02* (2013.01); *B60W 10/06* (2013.01); *F16D 13/54* (2013.01); *F16D 13/56* (2013.01);
(Continued)

(58) Field of Classification Search
CPC ...... F16D 13/54; F16D 13/56; F16D 2300/24; B60W 10/02; B60W 10/06; B60W 10/08; B60W 2510/0208
See application file for complete search history.

(56) References Cited

U.S. PATENT DOCUMENTS

2002/0094899 A1* 7/2002 Hamai .................... F16H 3/725
475/5

FOREIGN PATENT DOCUMENTS

| JP | 07-069268 | 3/1995 |
|----|-----------|--------|
| JP | 08-128462 | 5/1996 |

(Continued)

*Primary Examiner* — Huan Le
(74) *Attorney, Agent, or Firm* — Knobbe Martens Olson & Bear, LLP (57) ABSTRACT

A power transmitting apparatus comprising a clutch housing, an input member connected to an engine and mounted thereon, driving-side clutch discs, a clutch member connected to an output member, driven-side clutch discs arranged between the driving-side clutch discs, a pressure member for press-contacting the driving-side clutch discs and the driven-side clutch discs together and for releasing the press-contacting force on them, and a starter, such as a kick-starter, able to apply a rotational force to the output member to start the engine, the power transmitting apparatus adapted to transmit or cut off driving power of the engine inputted to the input member to or from the output member. The power transmitting apparatus can comprise a press-contact assisting cam of an inverse-driving side for increasing the press-contacting force on the driving-side clutch discs and the driven-side clutch discs when rotational force is applied to the output member by the kick starter.

15 Claims, 12 Drawing Sheets

(51) Int. Cl.
     *F16D 13/56*       (2006.01)
     *B60W 10/06*      (2006.01)

(52) U.S. Cl.
     CPC . *B60W 2510/0208* (2013.01); *F16D 2300/24* (2013.01); *Y10T 477/79* (2015.01)

(56) References Cited

FOREIGN PATENT DOCUMENTS

| | | |
|---|---|---|
| JP | 2001-050294 | 2/2001 |
| JP | 2004-232807 | 8/2004 |
| JP | 2005-325993 | 11/2005 |

\* cited by examiner

POWER TRANSMITTING APPARATUS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Technical Field

The present inventions relate to a power transmitting apparatus for transmitting or cutting-off the rotational driving power of an engine inputted to an input member to or from an output member.

Description of the Related Art

In general, a power transmission apparatus used in a motorcycle is intended to arbitrarily perform transmission or cutting-off of the driving power of the engine to or from a transmission and a driving wheel and comprises an input member connected to an engine-side, an output member connected to the transmission and driving wheel-side, and a clutch member connected to the output member. The power can be transmitted by press-contacting a plurality of driving-side clutch discs and driven-side clutch discs with each other and can be cut off by releasing the press-contacting force acting on the driving-side clutch discs and driven-side clutch discs.

More particularly, power transmitting apparatuses may comprise a clutch housing rotatable together with an input member and a plurality of driving-side clutch discs mounted thereon, a plurality of driven-side clutch discs arranged between the driving-side clutch discs of the clutch housing alternately therewith, a clutch member connected to an output member, and a pressure member mounted on the clutch member axially movably relative to the clutch member for forcing the driving-side clutch discs and the driven-side clutch discs to be press-contacted with each other and to release the press-contacting force acting on them in accordance with axial movement relative to the clutch member. Such power transmitting apparatuses are constructed to be able to transmit or cut off the driving power of the engine inputted to the input member to or from the output member by press-contacting the driving-side clutch discs with the driven-side clutch discs or by releasing a press-contacting force acting on them.

As disclosed in JP 2005-325993 A, a power transmitting apparatus has been proposed which is provided with a press-contact assisting cam of normal-driving side for increasing the press-contacting force acting on the driving-side clutch discs and the driven-side clutch discs when the rotational driving power of the engine inputted to the input member is transmitted to the output member. According to the power transmitting apparatus of the JP 2005-325993 patent document, since it is possible to increase the press-contacting force between the driving-side clutch discs and the driven-side clutch discs by the press-contact assisting cam of normal-driving side, it is possible to maintain a desirable power transmitting performance, although the power transmitting capacity is reduced by reducing the number of the driving-side and driven-side clutch discs or spring load and thus the size of the power transmitting apparatus is reduced.

SUMMARY OF THE INVENTIONS

An aspect of at least one of the inventions disclosed herein includes the realization that, in the power transmitting apparatus of the JP 2005-325993 patent document, there are when the kick-starter operated by leg power of a driver is applied to the power transmitting apparatus. That is, since the rotational force of the kick-starting means is applied to the engine via the power transmitting apparatus through a force transmission direction inverse to that of the normal power transmitting path from the engine, the press-contact assisting cam of the normal-driving side cannot perform its function when the rotational force of the kick-starting means is applied to the engine.

In addition, since the power transmitting capacity is reduced when the press-contact assisting cam of the normal-driving side does not function in the power transmitting apparatus provided with the press-contact assisting cam in the normal-driving side and having a small power transmitting capacity, slippage may be caused between the driving-side clutch discs and the driven-side clutch discs when trying to start the engine by the kick-starter. In some such cases, desirable power transmission may not be achieved and the engine may not be started. In such a case, if the power transmitting capacity is increased in order to achieve a sure engine start by the kick-starting means, the size of the power transmitting apparatus would be increased.

It is, thus, another aspect of at least one of the present inventions disclosed herein that a power transmitting apparatus can surely start an engine by a kick-starter without increasing the power transmitting capacity and thus the size of the power transmitting apparatus.

Thus, in accordance with an embodiment, a power transmitting apparatus can comprise a clutch housing rotatable together with an input member connected to an engine and mounted thereon a plurality of driving-side clutch discs. A clutch member can be connected to an output member. A plurality of driven-side clutch discs can be arranged between the driving-side clutch discs alternately therewith. The power transmitting apparatus can include a pressure member which can force the driving-side clutch discs and the driven-side clutch discs to be press-contacted with each other and can release the press-contacting force acting on them in accordance with approach or separation of the pressure member relative to the clutch member. A kick-starter can apply a rotational force to the output member to start the engine by transmitting the rotational force to the engine via the clutch member. The power transmitting apparatus can be adapted to be able to transmit or cut off the driving power of the engine inputted to the input member to or from the output member by press-contacting the driving-side clutch discs with the driven-side clutch discs or by releasing a press-contacting force acting on the clutch discs. The power transmitting apparatus can comprise a press-contact assisting cam of the inverse-driving side for increasing the press-contacting force acting on the driving-side clutch discs and the driven-side clutch discs when the rotational force is applied to the output member by the kick starter.

In some embodiments, the power transmitting apparatus further comprises a press-contact assisting cam of the normal-driving side for increasing the press-contacting force acting on the driving-side clutch discs and the driven-side clutch discs when the rotational driving power of the engine inputted to the input member is transmitted to the output member.

In some embodiments, the press-contact assisting cam of the inverse-driving side and the press-contact assisting cam of the normal-driving side are formed by inclined surfaces oppositely formed on the clutch member and the pressure member.

In some embodiments, one pair of the inclined surfaces are formed on opposite end surfaces of openings formed in either one of the clutch member or the pressure member, and another pair of the inclined surfaces are formed on both end surfaces of a projected portion formed on the other of the clutch member and the pressure member and adapted to be passed through the openings. In some embodiments, the inclined surface formed on the one end surface of the opening and the inclined surface formed on the one end surface of the projected portion constitute the press-contact assisting cam of inverse-driving side, and the inclined surface formed on the other end surface of the opening and the inclined surface formed on the other end surface of the projected portion constitute the press-contact assisting cam of normal-driving side.

In some embodiments, intervention members are arranged in gaps between the end surfaces of the opening and the end surfaces of the projected portion after the pressure member has been assembled to the clutch member by passing the projected portions through the openings.

In some embodiments, the driven-side clutch discs are arranged on both the clutch member and the pressure member.

In some embodiments where the power transmitting apparatus further comprises a press-contact assisting cam of the inverse-driving side for increasing the press-contacting force acting on the driving-side clutch discs and the driven-side clutch discs when the rotational force is applied to the output member by the kick starter, it is possible to surely perform the engine start by the kick-starter without increasing the power transmitting capacity.

In some embodiments where the power transmitting apparatus further comprises a press-contact assisting cam of the normal-driving side for increasing the press-contacting force acting on the driving-side clutch discs and the driven-side clutch discs when the rotational driving power of the engine inputted to the input member is transmitted to the output member, it is possible not only to increase the press-contacting force between the driving-side clutch discs and the driven-side clutch discs through the functioning of the press-contact assisting cam of the inverse-driving side when the engine is started by the kick-starter, but it is also possible to increase the press-contacting force between the driving-side clutch discs and the driven-side clutch discs through the functioning of the press-contact assisting cam of the normal-driving side when the clutch operation is performed (e.g., a condition in which the rotational driving power of the engine inputted to the input member can be transmitted to the output member is attained).

In some embodiments where the press-contact assisting cam of the inverse-driving side and the press-contact assisting cam of the normal-driving side are formed by inclined surfaces oppositely formed on the clutch member and the pressure member, it is possible to form the press-contact assisting cam of the inverse-driving side and the press-contact assisting cam of the normal-driving side as a simple structure.

In some embodiments where one pair of the inclined surfaces are formed on opposite end surfaces of openings formed in either one of the clutch member and the pressure member, and the other pair of the inclined surfaces are formed on both end surfaces of a projected portions formed on the other of the clutch member and the pressure member and are adapted to be passed through the openings, and wherein the inclined surface formed on the one end surface of the opening and the inclined surface formed on the one end surface of the projected portion constitute the press-contact assisting cam of inverse-driving side, and the inclined surface formed on the other end surface of the opening and the inclined surface formed on the other end surface of the projected portion constitute the press-contact assisting cam of normal-driving side, it is possible to surely and smoothly perform the increase of press-contacting forces in both the press-contact assisting cam of the inverse-driving side and the press-contact assisting cam of the normal-driving side.

In some embodiments wherein intervention members are arranged in gaps between the end surfaces of the opening and the end surfaces of the projected portion after the pressure member has been assembled to the clutch member by passing the projected portions through the openings, it is possible to prevent formation of gaps between end surfaces of the openings and projected portions and to suppress generation of abnormal noise during clutch operation and engine start by kick-starter. In some such cases, it is possible to improve the operability of the power transmitting apparatus.

In some embodiments where the driven-side clutch discs are arranged on both the clutch member and the pressure member, it is possible to suppress generation of abnormal noise during clutch operation (e.g., during application of the press-contacting force to both the driving-side and driven-side clutch discs) and to improve the operability of the power transmitting apparatus.

DETAILED DESCRIPTION OF THE PREFERRED EMBODIMENTS

Figure 1:
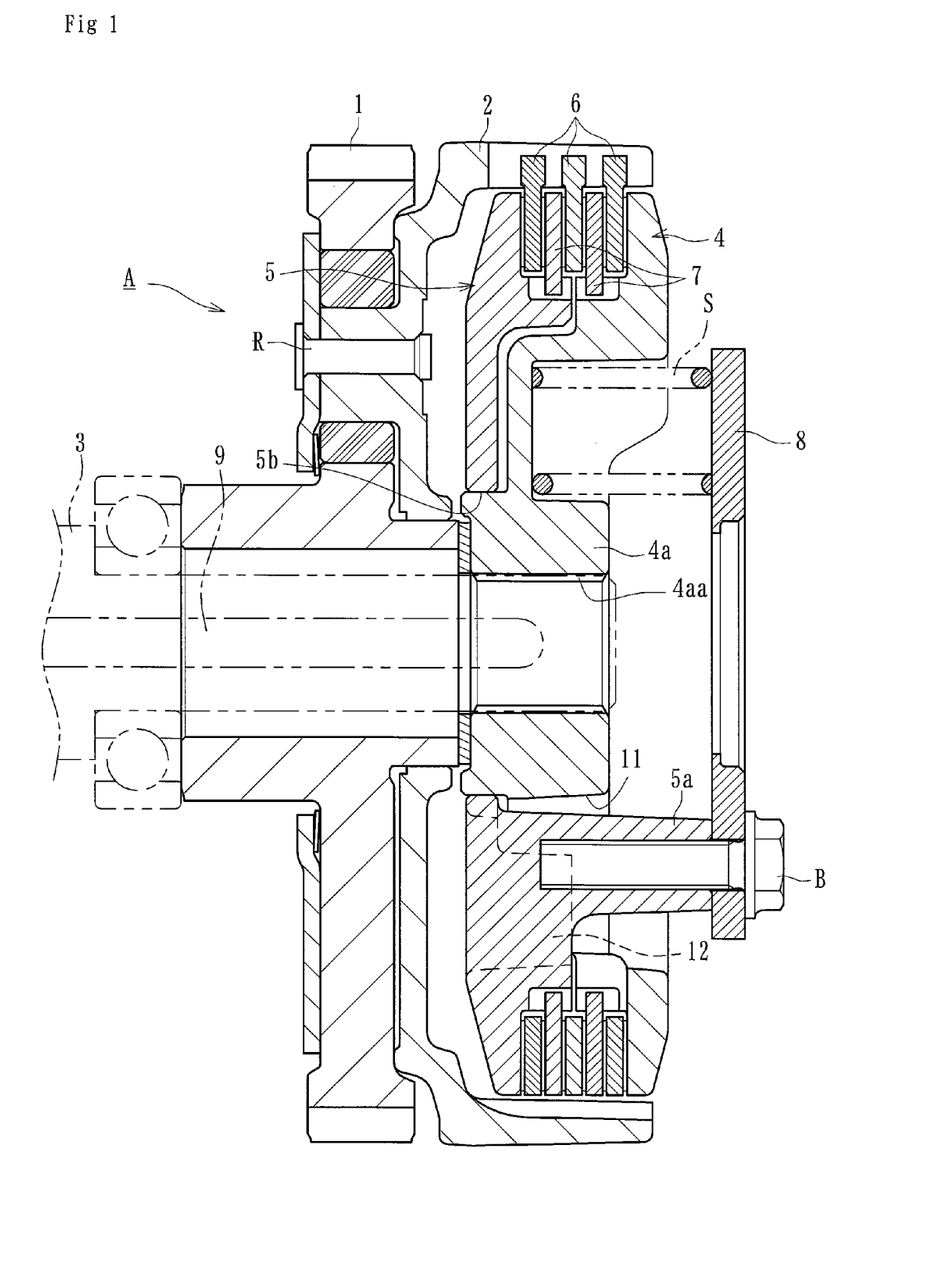
FIG. 1 is a longitudinal sectional view of a power transmitting apparatus of an embodiment.
Figure 7:
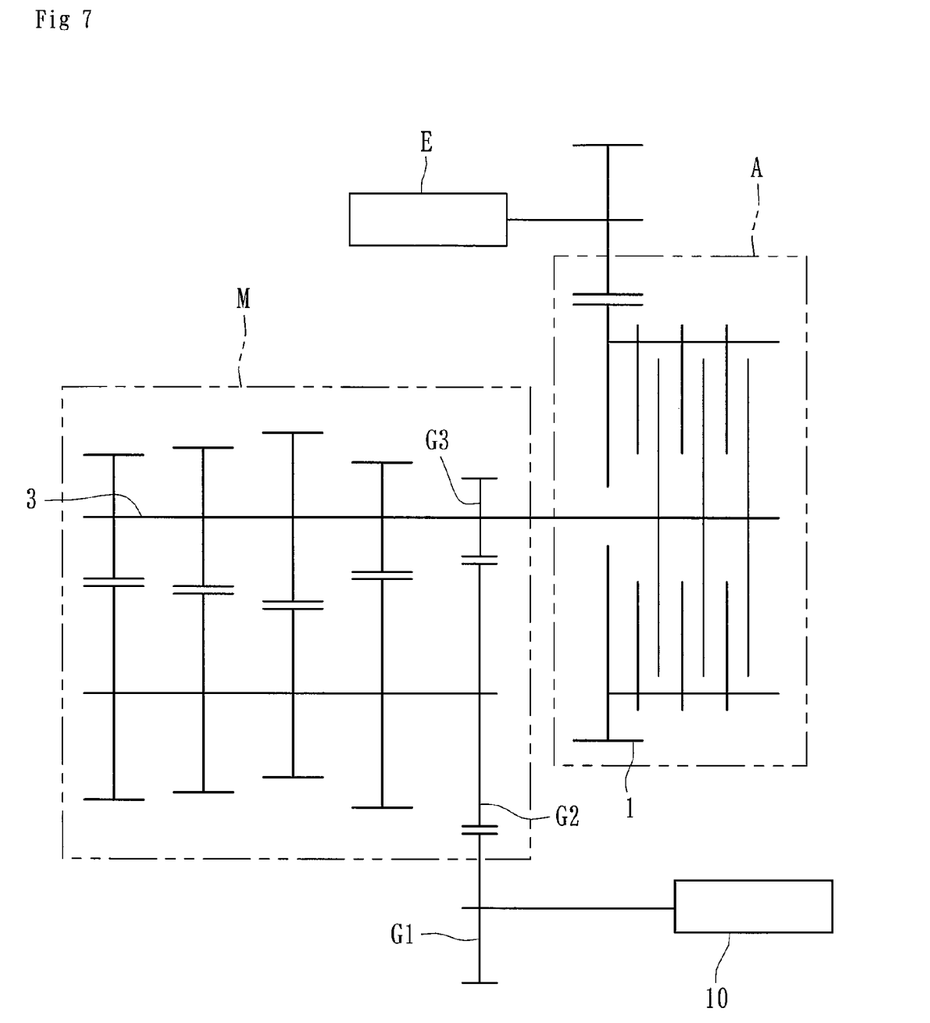
FIG. 7 is a schematic view showing an arrangement position of the kick-starter of the power transmitting apparatus of FIG. 1.

A power transmitting apparatus "A" of the present disclosure can be mounted on a vehicle such as a motorcycle to arbitrarily transmit or cut off the driving power of an engine "E" to or from a transmission "M" or driving wheel (see, e.g., FIG. 7). As shown in FIG. 1, the power transmitting apparatus "A" can comprise a clutch housing 2 on which a gear 1 as an input member is mounted, a clutch member 4 connected to a shaft 3 as an output member, a pressure member 5 mounted on the clutch member 4 at its right-hand end (e.g., in view of FIG. 1), driving-side clutch discs 6 connected to the clutch housing 2, and driven-side clutch discs 7 connected to the clutch member 4 and the pressure member 5.

The gear 1 can be rotated around the shaft 3 by the driving power (e.g., rotational power) transmitted from the engine "E" and can be connected to the clutch housing 2 via rivets "R" etc. The clutch housing 2 can be formed as a cylindrical casing opened at its right-hand end (e.g., as seen in FIG. 1) and a plurality of driving-side clutch discs 6 can be mounted on the inner circumference of the clutch housing 2. Each of the driving-side clutch discs 6 can comprise a substantially annular plate and can be adapted to be rotated together with the clutch housing 2 and to be axially slidable (e.g., leftward and rightward directions with reference to FIG. 1).

The clutch member 4 can comprise a member arranged within the clutch housing 2 and formed with a cylindrical portion 4a at the center thereof. The cylindrical portion 4a can be formed with a splined fitting aperture 4aa for receiving a splined tip end of the shaft 3. This can allow axial movement of the clutch member 4 and can enable rotation of the shaft 3 due to rotation of the clutch member 4. The pressure member 5 can be axially slidably mounted on the cylindrical portion 4a of the clutch member 4.

The pressure member 5 can be formed with a through aperture 5b at the center thereof for receiving the cylindrical portion 4a of the clutch member 4 so as to be mounted on the clutch member 4. The pressure member 5 can be integrally formed with a plurality of (e.g., three, in some embodiments) boss portions 5a arranged on a same circle and adapted to be passed through openings 11 formed in the clutch member 4 when the clutch member 4 and the pressure member 5 are assembled together as described later more in detail.

In addition, an annular member 8 can be secured by bolts "B" on the tip end of the boss portions 5a. A plurality of (e.g., three, in some embodiments) clutch springs "S" can be mounted on the annular member 8 on a same circle and these springs "S" can usually urge the clutch member 4 toward the pressure member 5 (e.g., leftward in FIG. 1). Accordingly, the driving-side clutch discs 6 are usually press-contacted with the driven-side clutch discs 7 and thus the driving power of the engine "E" can be transmitted to the shaft 3.

The outer circumferences of the clutch member 4 and the pressure member 5 can be formed with axially extending splines on which the driven-side clutch discs 7 are engaged. That is, according to the embodiment shown in FIG. 1, the driven-side clutch discs 7 are arranged on both the clutch member 4 and the pressure member 5. The driven-side clutch discs 7 can be formed of substantially annular plates and arranged alternately with the driving-side clutch discs 6 to form a laminated (e.g., interleaved) structure. The driven-side clutch discs 7 are mounted rotatably together with clutch member 4 and pressure member 5 and also axially movably.

Figure 11:
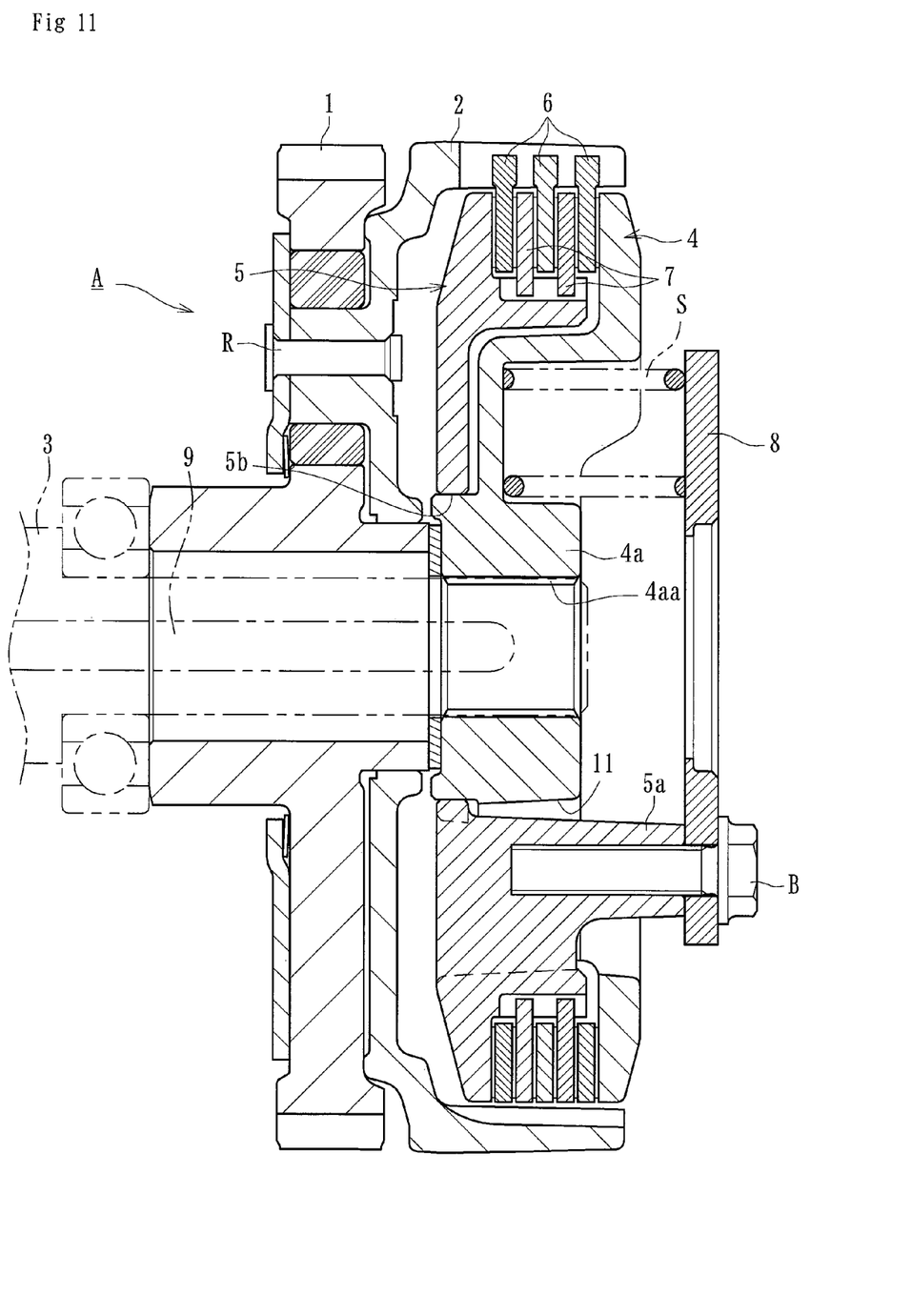
FIG. 11 is a longitudinal sectional view of a power transmitting apparatus of another embodiment in which all the driven-side clutch discs are arranged on the pressure member.
Figure 12:
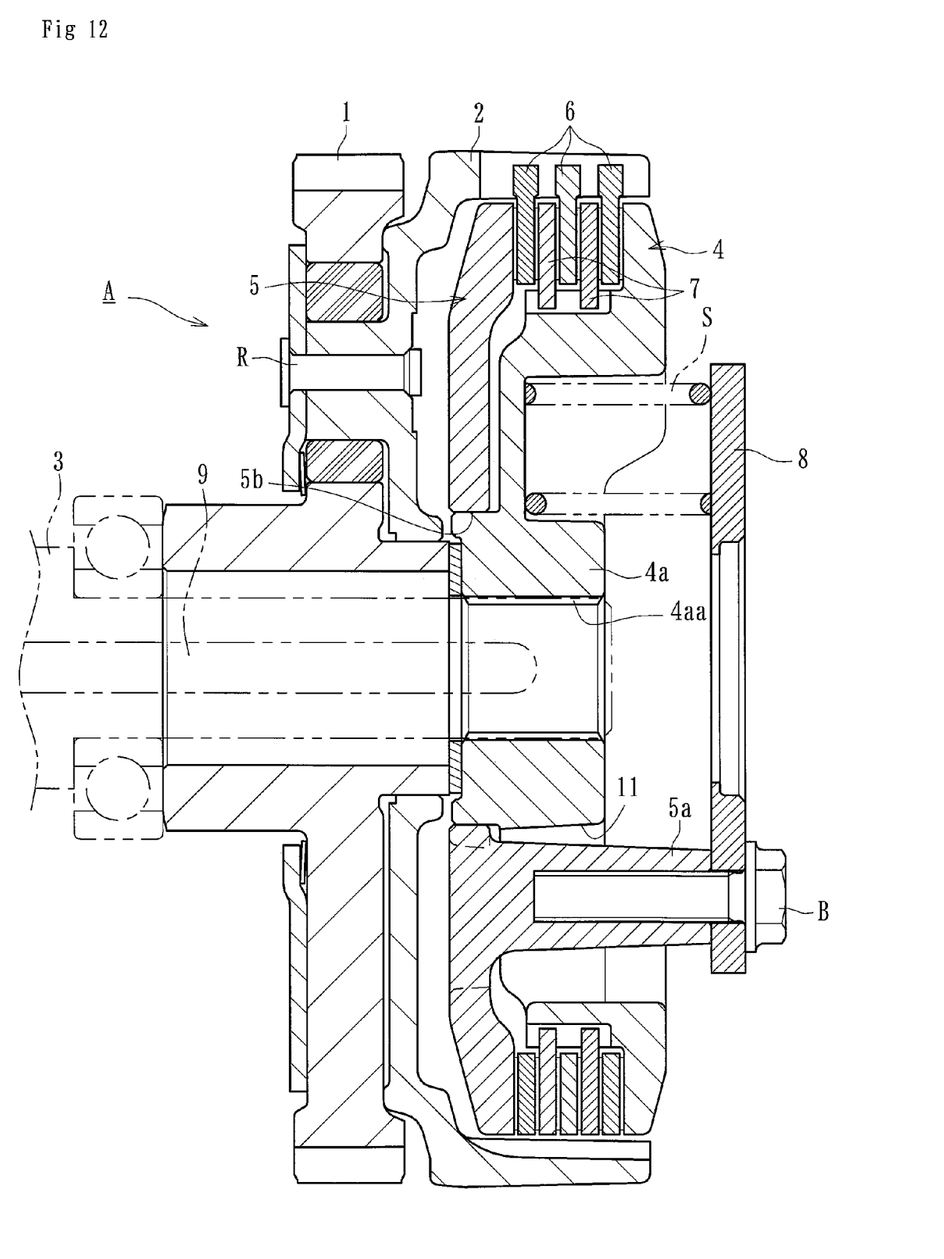
FIG. 12 is a longitudinal sectional view of a power transmitting apparatus of another embodiment in which all the driven-side clutch discs are arranged on the clutch member.

Although it is shown in the embodiment of FIG. 1 that the driven-side clutch discs 7 are mounted on both the clutch member 4 and the pressure member 5, it is possible to mount all the driven-side clutch discs 7 on the pressure member 5 as shown in FIG. 11 or on the clutch member 4 as shown in FIG. 12. In addition, in cases where the driven-side clutch discs 7 are mounted on both the clutch member 4 and the pressure member 5, the distribution of the driven-side clutch discs 7 to be mounted on the clutch member 4 and the pressure member 5 (e.g., the number of driven-side clutch discs 7 on each of the clutch member 4 and the pressure member 5) can be arbitrarily determined.

As illustrated, an axially extending push rod 9 can be arranged in the shaft 3. The push rod 9 can be projected toward the right-hand in FIG. 1, with a driver of a vehicle operating an operation device (which can serve as an operation means) to move the clutch member 4 relative to the pressure member 5 against the force of clutch springs "S" to separate them. Thus the press-contacting force acting on the driving-side clutch discs 6 and the driven-side clutch discs 7 can be released such that the rotational driving power inputted to the gear 1 and the clutch housing 2 cannot be transmitted to the clutch member 4 and the shaft 3.

That is, the driving power of the engine "E" can be transmitted to the shaft 3 with the driving-side clutch discs 6 and the driven-side clutch discs 7 being press-contacted by the urging force of the clutch springs "S". On the contrary, the driving power of the engine "E" cannot be transmitted to the shaft 3 when the clutch member 4 is separated from pressure member 5 by clutch operation to release the press-contacting force between the driving-side clutch discs 6 and the driven-side clutch discs 7. In this way, the pressure member 5 forces the driving-side clutch discs 6 and the driven-side clutch discs 7 to be press-contacted with each other and releases the press-contacting force acting on them in accordance with approach or separation of the pressure member 5 relative to the clutch member 4.

As shown in FIG. 7, a starter 10, which in some embodiments can be in the form of a kick-starter (which can serve as kick-starter means) can apply a rotational force to the shaft (e.g., the output member) 3 to start the engine "E" by transmitting the rotational force to the engine "E" via the clutch member 4. That is, the kick-starter 10 can be operated by a driver of vehicle (e.g., a motorcycle) to start the engine "E" and can be connected via gears G1-G3 to a transmission "M" connected to the power transmitting apparatus "A". The rotational force applied to the kick-starter 10 by a driver can be transmitted to the shaft 3 via the gears G1-G3, and further to the clutch member 4, to the clutch housing 2, to the gear (e.g., the input member) 1 and finally to a crankshaft (not shown) of the engine "E" to start it.

According to some embodiments, the power transmitting apparatus includes a press-contact assisting cam of a normal-driving side and a press-contact assisting cam of an inverse-driving side. The press-contact assisting cam of the normal-driving side can be a cam for increasing the press-contacting force between the driving-side clutch discs 6 and the driven-side clutch discs 7 when the driving power from the engine "E" inputted to the gear (e.g., the input member) 1 can be transmitted to the shaft (e.g., output member) 3. On the contrary, the press-contact assisting cam of the inverse-driving side can be a cam for increasing the press-contacting force between the driving-side clutch discs 6 and the driven-side clutch discs 7 when the rotational force from the kick-starter 10 inputted to the shaft (e.g., the output member) 3 can be transmitted to the engine "E".

Figure 2:
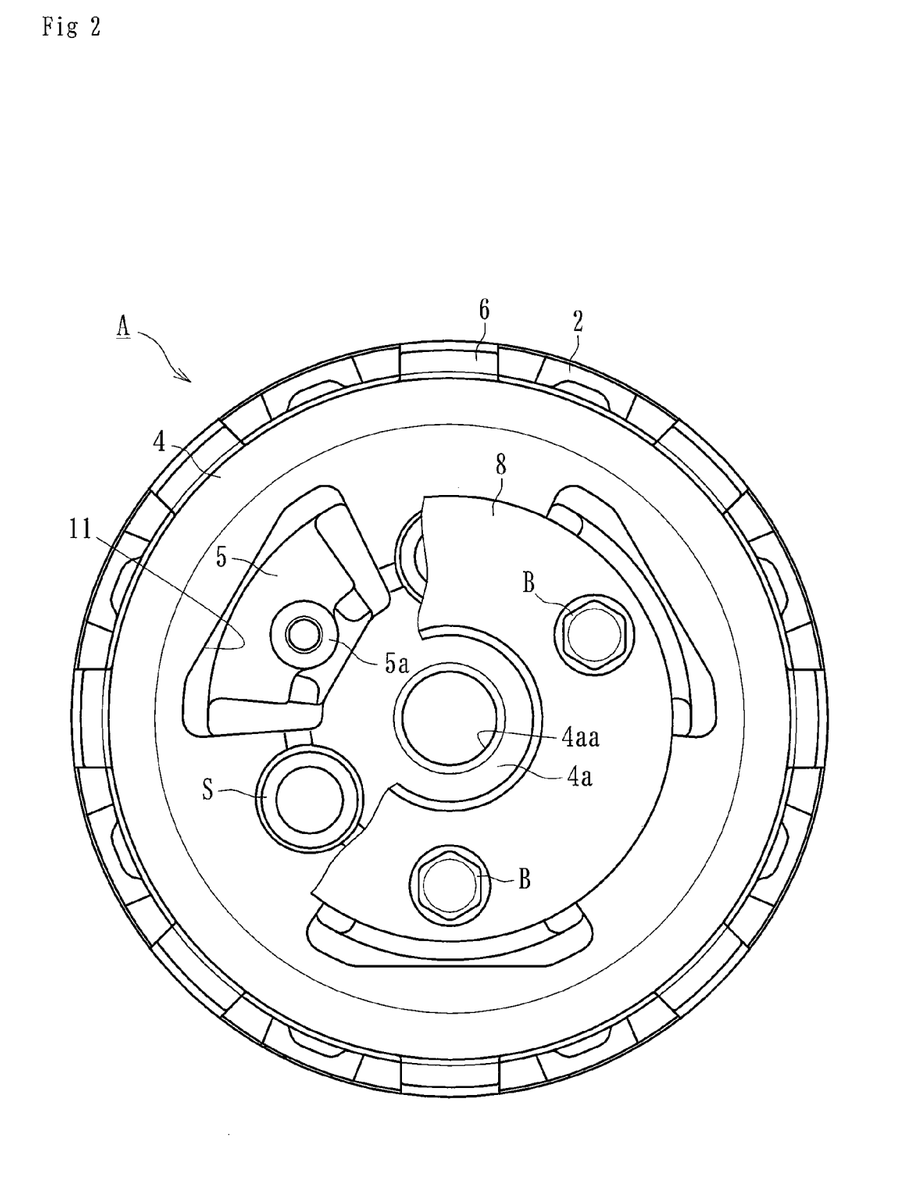
FIG. 2 is a front elevation view showing the power transmitting apparatus of FIG. 1.
Figure 3:
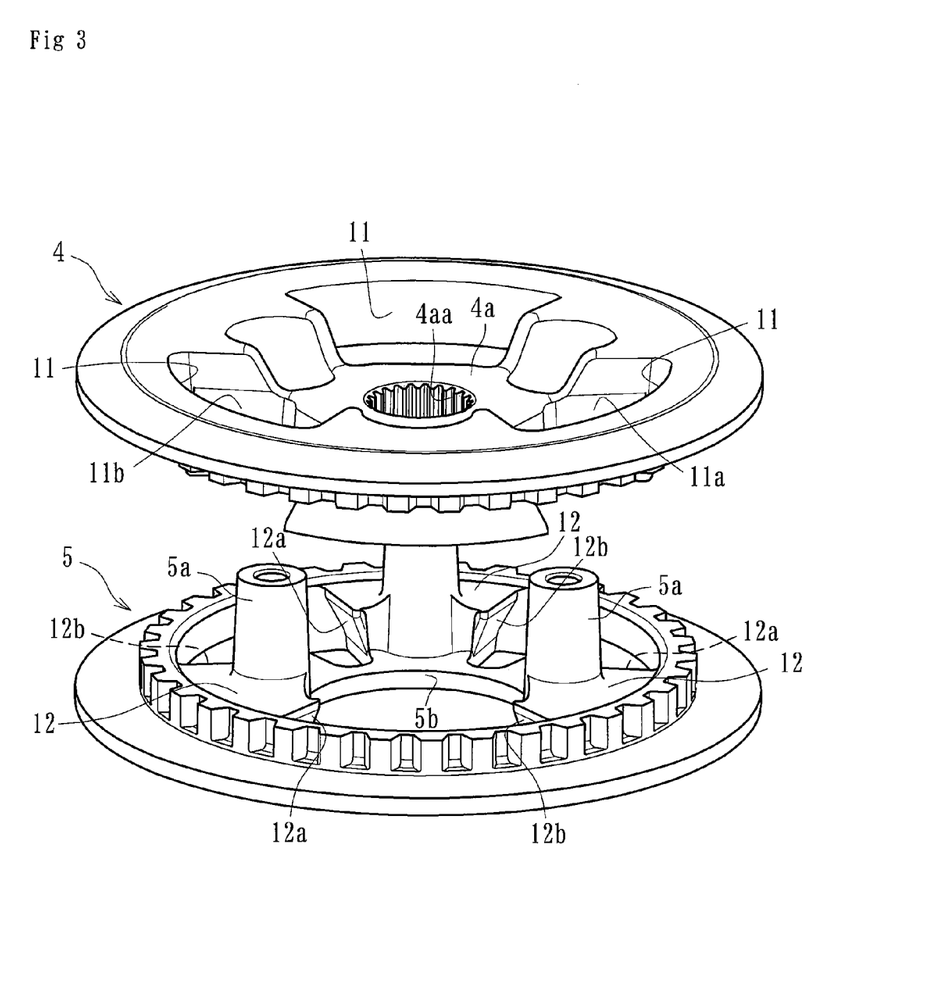
FIG. 3 is a perspective view showing a clutch member and a pressure member of the power transmitting apparatus of FIG. 1.
Figure 4:
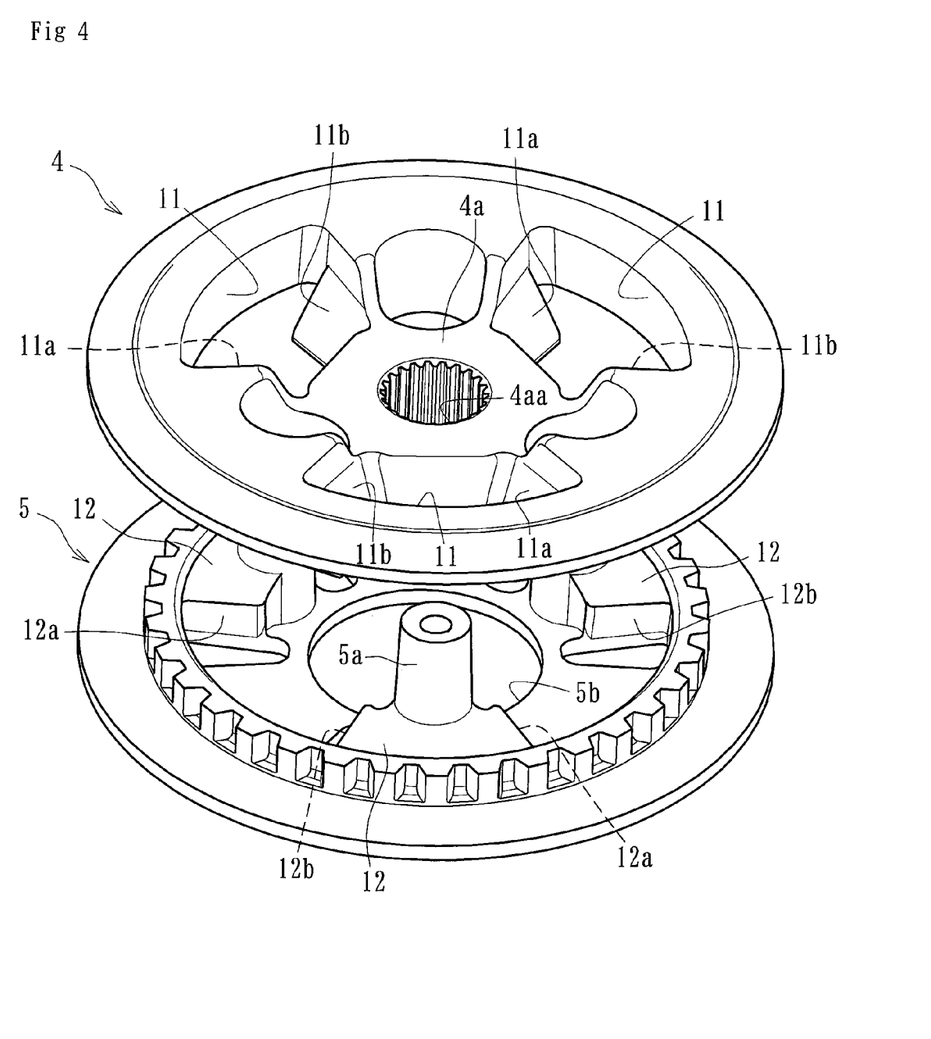
FIG. 4 is another perspective view showing a clutch member and a pressure member of the power transmitting apparatus of FIG. 1.

The press-contact assisting cam of the normal-driving side and the press-contact assisting cam of the inverse-driving side can be formed by paired inclined surfaces formed respectively on openings 11 of the clutch member 4 and on the projected portions 12 of the pressure member 5 (see, e.g., FIGS. 2-4). For example, the inclined surfaces 11a and 11b can be formed on opposite end surfaces of each opening 11 of the clutch member 4, and inclined surfaces 12a and 12b can be formed on opposite end surfaces of each projected portion 12. In some such embodiments, paired inclined surfaces (e.g., the inclined surface 11a formed on one end surface of the opening 11 and the inclined surface 12a formed on one end surface of the projected portion 12) form the press-contact assisting cam of the inverse-driving side, and other paired inclined surfaces (e.g. the inclined surface 11b formed on the other end surface of the opening 11 and the inclined surface 12b formed on the other end surface of the projected portion 12) form the press-contact assisting cam of the normal-driving side.

A plural number of (e.g., three in the illustrated embodiment) openings 11 can be formed on the clutch member 4 equidistantly on a same circle. The projected portions 12 can be arranged on the pressure member 5 at positions corresponding to those of the openings 11 and can be formed with boss portions 5a projected from the projected portions 12 substantially at the center thereof. When the clutch member 4 and pressure member 5 are assembled together, the projected portions 12 can be passed through the openings 11 and the boss portions 5a can be projected therefrom.

As previously described, one pair of the inclined surfaces 11a, 11b can be formed on opposite end surfaces of openings 11 formed in either one of the clutch member 4 and the pressure member 5, and the other pair of the inclined surfaces 12a, 12b can be formed on both end surfaces of a projected portions 12 formed on the other of the clutch member 4 and the pressure member 5 and adapted to be passed through the openings 11. The inclined surface 11a formed on the one end surface of the opening 11 and the inclined surface 12a formed on the one end surface of the projected portion 12 can constitute the press-contact assisting cam of inverse-driving side, and the inclined surface 11b formed on the other end surface of the opening 11 and the inclined surface 12b formed on the other end surface of the projected portion 12 can constitute the press-contact assisting cam of normal-driving side. In place of the illustrated embodiment, it is possible to form the openings 11 in the pressure member 5 and the projections 12 in the clutch member 4.

Figure 5:
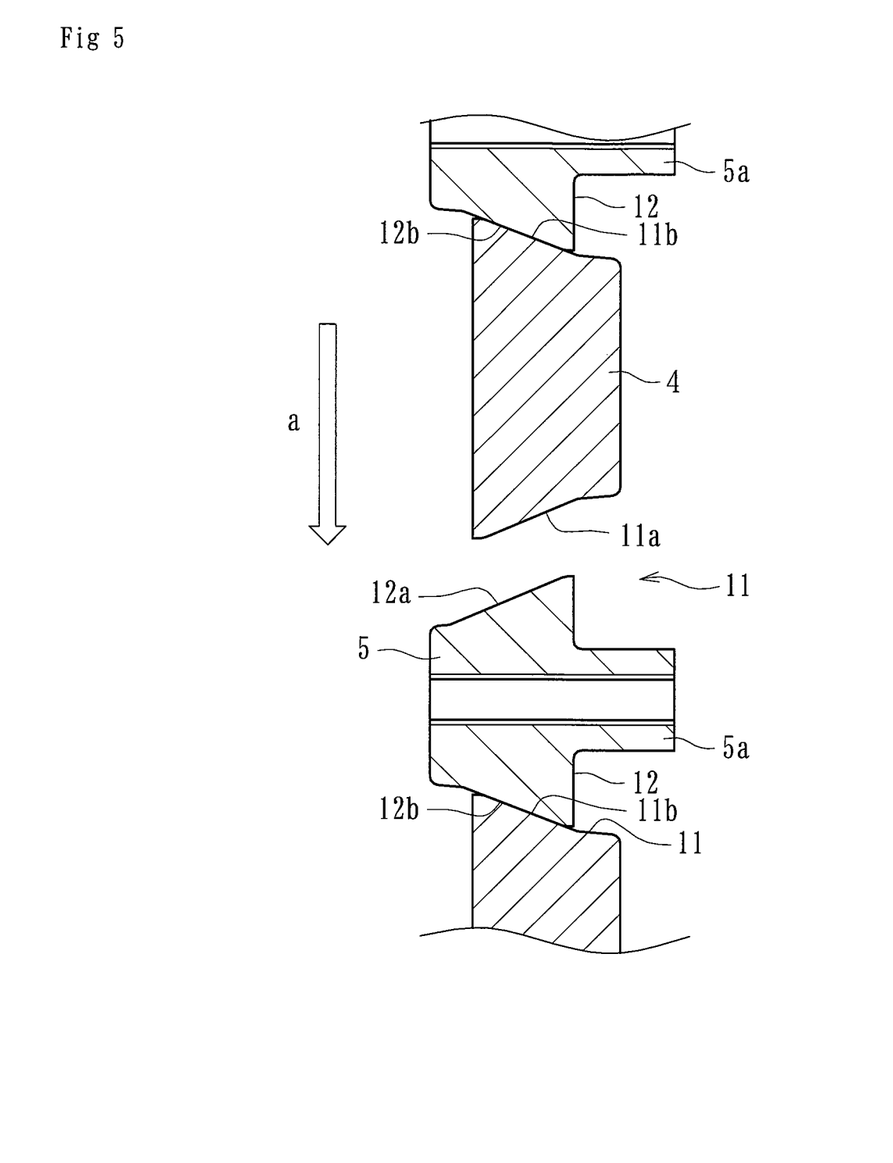
FIG. 5 is a schematic view showing a press-contact assisting cam of the normal-driving side and a press-contact assisting cam of the inverse-driving side of the power transmitting apparatus of FIG. 1 under a condition in which the press-contact assisting cam of the normal-driving side is activated.

As shown in FIG. 5, when the driving power of the engine "E" inputted to the gear (e.g., input member) 1 is transmitted to the shaft (e.g., output member) 3 (e.g., when the driving power of the engine "E" is transmitted to the shaft 3 via the pressure 5 and the clutch member 4), the inclined surfaces 11b of the opening 11 of the clutch member 4 is abutted with the inclined surfaces 12b of the projected portion 12 of the pressure member 5 and accordingly the pressure-contact assisting cam of normal-driving side functions to urge the clutch member 4 against the pressure member 5 to increase the press-contacting force between the driving-side clutch discs 6 and the driven-side clutch discs 7.

Figure 6:
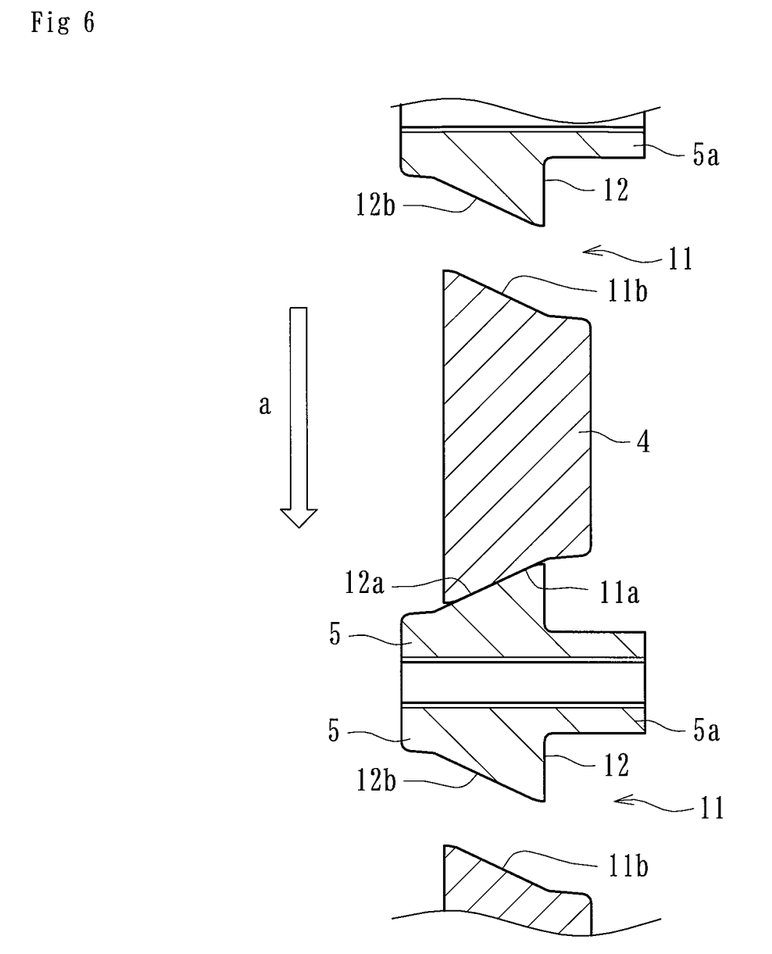
FIG. 6 is a schematic view showing a press-contact assisting cam of the normal-driving side and a press-contact assisting cam of the inverse-driving side of the power transmitting apparatus of FIG. 1 under a condition in which the press-contact assisting cam of the inverse-driving side is activated.

On the contrary, when the rotational force is applied to the shaft (e.g., output member) 3 by the kick-starter 10 (e.g., when the rotational force applied to the shaft 3 by the kick-starter 10 is transmitted to the engine "E" via the clutch member 4), the inclined surfaces 11a of the opening 11 of the clutch member 4 is abutted with the inclined surfaces 12a of the projected portion 12 of the pressure member 5 as shown in FIG. 6 and the pressure-contact assisting cam of inverse-driving side functions to urge the clutch member 4 against the pressure member 5 to increase the press-contacting force between the driving-side clutch discs 6 and the driven-side clutch discs 7. An arrow "a" in FIG. 5 shows the rotational direction of the pressure member 5 and an arrow "a" in FIG. 6 shows the rotational direction of the clutch member 6.

According to some embodiments, since the power transmitting apparatus is provided with the press-contact assisting cam of the inverse-driving side (e.g., inclined surfaces 11a and 12a) for increasing the press-contacting force between the driving-side clutch discs 6 and the driven-side clutch discs 7 when the rotational force is applied to the shaft (e.g., output member) 3 by the kick-starter 10, it can be possible to surely start the engine "E" by the kick-starter 10 without adopting other alternatives for increasing the power transmitting capacity, such as increase of urging force of the clutch springs "S" or increase of number of the driving-side clutch discs 6 and the driven-side clutch discs 7.

According to some embodiments, since the power transmitting apparatus includes not only the press-contact assisting cam of the normal-driving side (e.g., inclined surfaces 11b and 12b) but also the press-contact assisting cam of the inverse-driving side, it can be possible to increase the press-contacting force between the driving-side clutch discs 6 and the driven-side clutch discs 7 both in the normal power transmitting case (e.g., in case of clutch operation) and in the inverse power transmitting case (e.g., in case of kick-starting operation).

In addition, since the press-contact assisting cam of the inverse-driving side and the press-contact assisting cam of the normal-driving side are constituted by oppositely arranged inclined surface pairs (e.g., 11a, 12a and 11b, 12b) formed on the clutch member 4 and pressure member 5, these cams can be manufactured by simple structures.

Furthermore, since one pair of the inclined surfaces (e.g., 11a, 11b) are formed on opposite end surfaces of openings 11 formed in either one of the clutch member 4 and the pressure member 5, and the other pair of the inclined surfaces (e.g., 12a, 12b) are formed on both end surfaces of a projected portions 12 formed on the other of the clutch member 4 and the pressure member 5 and adapted to be passed through the openings 11, and the inclined surface 11a formed on the one end surface of the opening 11 and the inclined surface 12a formed on the one end surface of the projected portion 12 constitute the press-contact assisting cam of inverse-driving side, and the inclined surface 11b formed on the other end surface of the opening 11 and the inclined surface 12b formed on the other end surface of the projected portion 12 constitute the press-contact assisting cam of normal-driving side, it can be possible to surely and smoothly perform the increase of press-contacting forces in both the press-contact assisting cam of the inverse-driving side and the press-contact assisting cam of the normal-driving side.

In addition, according to an illustrated embodiment, since the driven-side clutch discs 7 are mounted both on the clutch member 4 and pressure member 5, the driving power can be transmitted and distributed to the clutch member 4 and the pressure member 5 and it can be possible to inhibit or prevent generation of abnormal noise and to improve the operability of the power transmitting apparatus.

Figure 8:
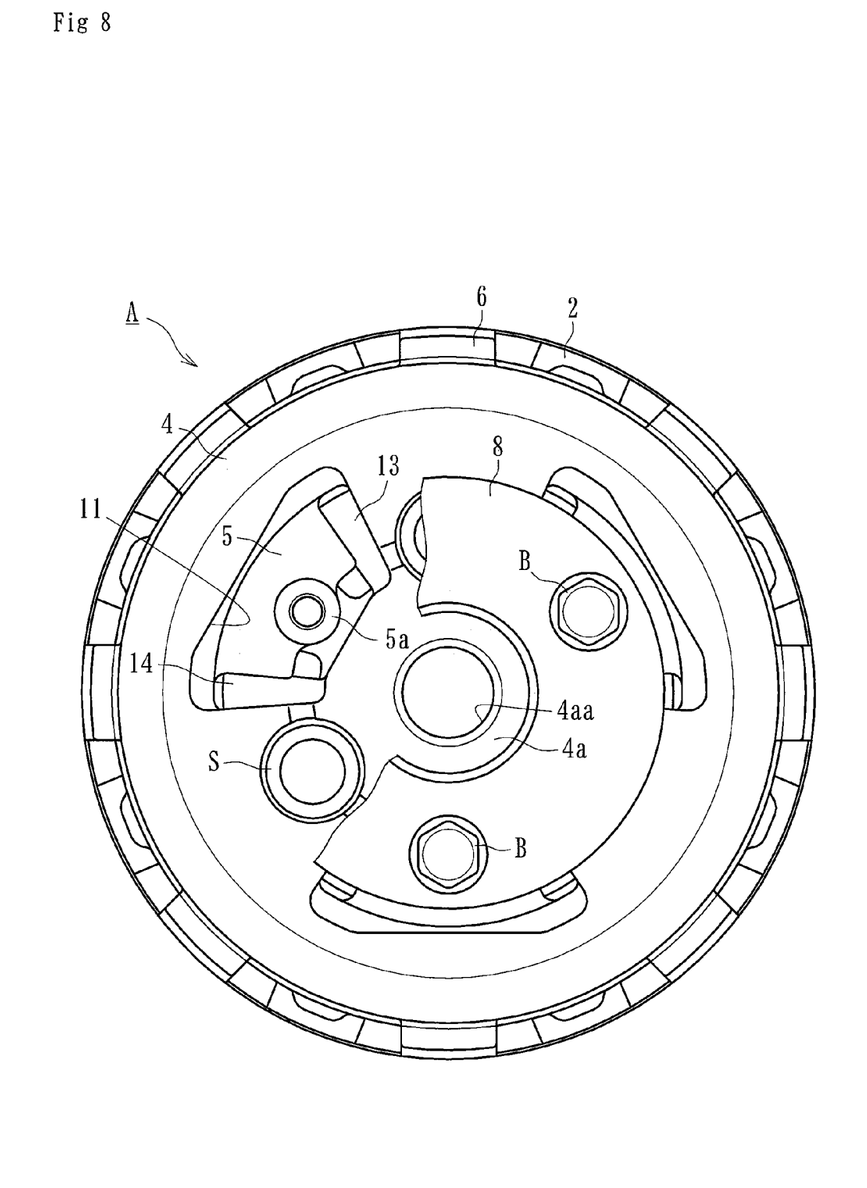
FIG. 8 is a front elevation view showing a power transmitting apparatus of another embodiment provided with intervention members on both sides of the projected portions and the openings.
Figure 9:
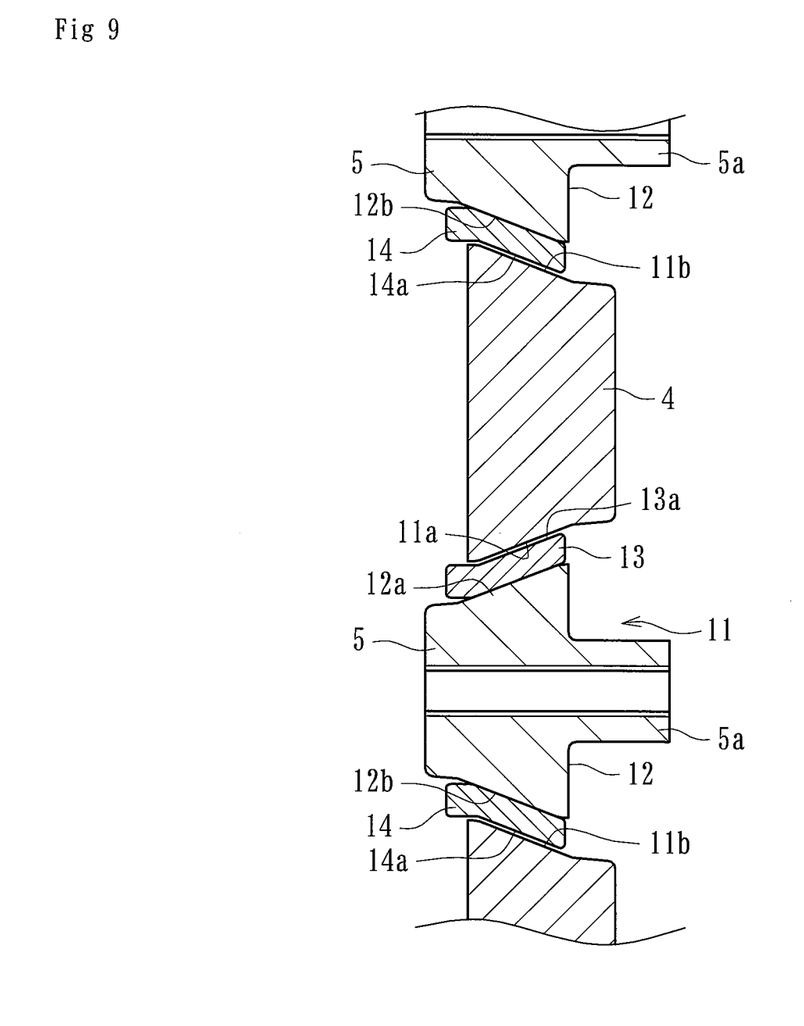
FIG. 9 is a partial schematic view of the power transmitting apparatus of FIG. 8.

As shown in FIGS. 8 and 9, it is possible to arrange intervention members 13, 14 in gaps between the end surfaces of the opening 11 and the end surfaces of the projected portion 12 after the pressure member 5 has been assembled to the clutch member 4 by passing the projected portions 12 through the openings 11. In some cases, an inclined surface 13a of the intervention member 13 is formed at a position opposed to the inclined surface 11a of one end surface of the opening 11 and the press-contact assisting cam of the inverse-driving side is formed by the inclined surfaces 11a, 13a. Similarly, an inclined surface 14a of the intervention member 14 can be formed at a position opposed to the inclined surface 11b of the other end surface of the opening 11 and the press-contact assisting cam of the normal-driving side is formed by the inclined surfaces 11b, 14a.

According to some such embodiments, since the intervention members 13, 14 are arranged in gaps between the end surfaces of the opening 11 and the end surfaces of the projected portion 12 after the pressure member 5 has been assembled to the clutch member 4 by passing the projected portions 12 through the openings 11, it can be possible to prevent formation of useless gaps between end surfaces of the openings 11 and the projected portions 12. In some such cases, it is possible to suppress generation of abnormal noise during clutch operation and engine start by the kick-starter 10 and also to improve the operability of the power transmitting apparatus.

Figure 10:
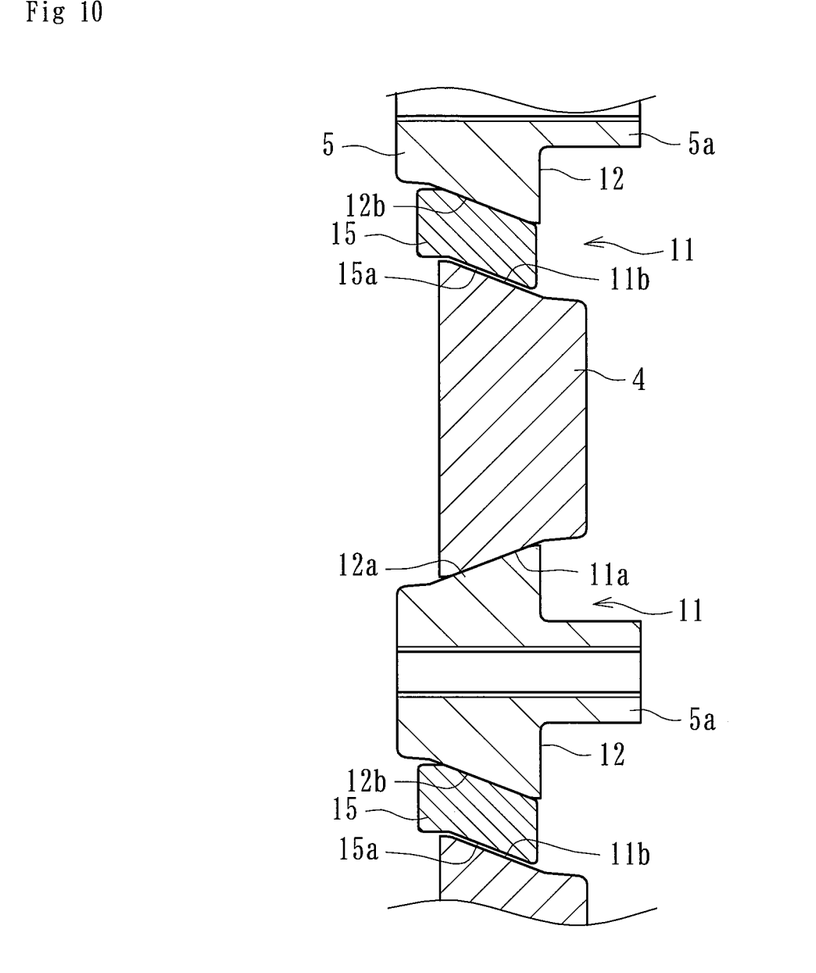
FIG. 10 is a partial schematic view of a power transmitting apparatus of yet another embodiment provided with an intervention member on one side of the projected portions and the openings.

Furthermore, it can be possible, as shown in FIG. 10, to arrange only one intervention member 15 in a gap between the other end surface of the opening 11 and the other end surface of the projected portion 12 after the pressure member 5 has been assembled to the clutch member 4 by passing the projected portions 12 through the openings 11. In some such cases, an inclined surface 15a of the intervention member 15 is formed at a position opposed to the inclined surface 11b of the other end surface of the opening 11 and the press-contact assisting cam of the normal-driving side is formed by the inclined surfaces 11b, 15a.

Similarly, a press-contact assisting cam of inverse-driving side can be formed by the inclined surface 12a of one end surface 12a of the projected portion 12 and the inclined surface 11a of the other end surface of the opening 11.

Although several embodiments of the present inventions have been described, the present inventions are not limited to these embodiments. For example, the present inventions may be applied to a power transmitting apparatus which is not provided with the press-contact assisting cam of normal driving side and provided with only the press-contact assisting cam of inverse-driving side. In addition, although the press-contact assisting cam of inverse-driving side and the press-contact assisting cam of the normal driving side can be formed by paired inclined surfaces formed integrally with the clutch member and the pressure member, the inclined surfaces can be formed on members separate from the clutch member and the pressure member. Furthermore, the power transmitting apparatus of the present inventions can be applied to other vehicles provided with multiple disc clutch such as automobiles, three or four-wheeled buggies or multi-purpose machines other than motorcycles.

The present inventions can be applied to any power transmitting apparatus including, but not limited to, power transmitting apparatuses which are provided with a press-contact assisting cam of an inverse-driving side for increasing the press-contacting force between the driving-side clutch discs and the driven-side clutch discs when the rotational force is applied to the output member by the kick-starter.

What is claimed is:

1. A power transmitting apparatus comprising:
an input member connected to an engine;
a clutch housing rotatable together with the input member;
a plurality of driving-side clutch discs mounted on the clutch housing;
an output member;
a clutch member connected to the output member;
a plurality of driven-side clutch discs arranged between the driving-side clutch discs alternately therewith;
a pressure member configured to force the driving-side clutch discs and the driven-side clutch discs to be press-contacted with each other and configured to release a press-contacting force acting on them in accordance with approach or separation of the pressure member relative to the clutch member; and
a kick-starter means configured to apply a rotational force to the output member to start the engine by transmitting the rotational force to the engine via the clutch member,
the power transmitting apparatus being configured to transmit a driving power of the engine inputted to the input member to the output member by press-contacting the driving-side clutch discs with the driven-side clutch discs or cut off the driving power of the engine inputted to the input member from the output member by releasing the press-contacting force acting on them;
wherein the power transmitting apparatus further comprises a press-contact assisting cam of an inverse-driving side, the press-contact assisting cam configured to increase the press-contacting force acting on the driving-side clutch discs and the driven-side clutch discs by mechanically translating the rotational force applied to the output member by the kick starter means into the press-contacting force in a direction parallel to an axis of rotation of the output member.

2. The power transmitting apparatus of claim 1, further comprising a press-contact assisting cam of a normal-driving side configured to increase the press-contacting force acting on the driving-side clutch discs and the driven-side clutch discs when the rotational driving power of the engine inputted to the input member is transmitted to the output member.

3. The power transmitting apparatus of claim 2, wherein the press-contact assisting cam of the inverse-driving side and the press-contact assisting cam of the normal-driving side are formed by inclined surfaces oppositely formed on the clutch member and the pressure member.

4. The power transmitting apparatus of claim 3, wherein one pair of the inclined surfaces is formed on opposite end surfaces of openings formed in either one of the clutch member and the pressure member, and a second pair of the inclined surfaces is formed on both end surfaces of projected portions formed on the other of the clutch member and the pressure member and adapted to be passed through the openings, wherein an inclined surface formed on one end surface of the opening and an inclined surface formed on one end surface of the projected portion constitute the press-contact assisting cam of the inverse-driving side, and wherein an inclined surface formed on another end surface of the opening and an inclined surface formed on another end surface of the projected portion constitute the press-contact assisting cam of the normal-driving side.

5. The power transmitting apparatus of claim 4, wherein intervention members are arranged in gaps between the end surfaces of the opening and the end surfaces of the projected portion after the pressure member has been assembled to the clutch member by passing the projected portions through the openings.

6. The power transmitting apparatus of claim 5, wherein the driven-side clutch discs are arranged on both the clutch member and the pressure member.

7. The power transmitting apparatus of claim 4, wherein the driven-side clutch discs are arranged on both the clutch member and the pressure member.

8. A power transmitting apparatus comprising:
an input member connected to an engine;
a clutch housing rotatable together with the input member;
a plurality of driving-side clutch discs mounted on the clutch housing;
an output member;
a clutch member connected to the output member;
a plurality of driven-side clutch discs arranged between the driving-side clutch discs alternately therewith;
a pressure member configured to force the driving-side clutch discs and the driven-side clutch discs to be press-contacted with each other and configured to release a press-contacting force acting on them in accordance with approach or separation of the pressure member relative to the clutch member; and
a starter configured to apply a rotational force to the output member to start the engine by transmitting the rotational force to the engine via the clutch member,
the power transmitting apparatus being configured to transmit a driving power of the engine inputted to the input member to the output member by press-contacting the driving-side clutch discs with the driven-side clutch discs or cut off the driving power of the engine inputted to the input member from the output member by releasing the press-contacting force acting on them;
wherein the power transmitting apparatus further comprises a press-contact assisting cam of an inverse-driving side, the press-contact assisting cam configured to increase the press-contacting force acting on the driving-side clutch discs and the driven-side clutch discs by mechanically translating the rotational force applied to the output member by the starter into the press-contacting force in a direction parallel to an axis of rotation of the output member.

9. The power transmitting apparatus of claim 8, further comprising a press-contact assisting cam of a normal-driving side configured to increase the press-contacting force acting on the driving-side clutch discs and the driven-side clutch discs when the rotational driving power of the engine inputted to the input member is transmitted to the output member.

10. The power transmitting apparatus of claim 9, wherein the press-contact assisting cam of the inverse-driving side and the press-contact assisting cam of the normal-driving side are formed by inclined surfaces oppositely formed on the clutch member and the pressure member.

11. The power transmitting apparatus of claim 10, wherein one pair of the inclined surfaces is formed on opposite end surfaces of openings formed in either one of the clutch member and the pressure member, and a second pair of the inclined surfaces is formed on both end surfaces of projected portions formed on the other of the clutch member and the pressure member and adapted to be passed through the openings, wherein an inclined surface formed on one end surface of the opening and an inclined surface formed on one end surface of the projected portion constitute the press-contact assisting cam of the inverse-driving side, and wherein an inclined surface formed on another end surface of the opening and an inclined surface formed on another end surface of the projected portion constitute the press-contact assisting cam of the normal-driving side.

12. The power transmitting apparatus of claim 11, wherein intervention members are arranged in gaps between the end surfaces of the opening and the end surfaces of the projected portion after the pressure member has been assembled to the clutch member by passing the projected portions through the openings.

13. The power transmitting apparatus of claim 12, wherein the driven-side clutch discs are arranged on both the clutch member and the pressure member.

14. The power transmitting apparatus of claim 11, wherein the driven-side clutch discs are arranged on both the clutch member and the pressure member.

15. The power transmitting apparatus of claim 8, wherein the starter is a kick-starter.

* * * * *